(12) United States Patent
Hoang et al.

(10) Patent No.: US 11,392,607 B2
(45) Date of Patent: Jul. 19, 2022

(54) AUTOMATIC FEATURE ENGINEERING DURING ONLINE SCORING PHASE

(71) Applicant: INTERNATIONAL BUSINESS MACHINES CORPORATION, Armonk, NY (US)

(72) Inventors: Thanh Lam Hoang, Maynooth (IE); Hong Min, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 16/777,068

(22) Filed: Jan. 30, 2020

(65) Prior Publication Data

US 2021/0240727 A1 Aug. 5, 2021

(51) Int. Cl.
| | | |
|---|---|---|
| *G06N 20/00* | (2019.01) | |
| *G06F 16/26* | (2019.01) | |
| *G06F 16/22* | (2019.01) | |
| *G06F 16/28* | (2019.01) | |
| *G06F 16/248* | (2019.01) | |

(52) U.S. Cl.
CPC .......... *G06F 16/26* (2019.01); *G06F 16/2272* (2019.01); *G06F 16/248* (2019.01); *G06F 16/287* (2019.01); *G06N 20/00* (2019.01)

(58) Field of Classification Search
CPC .... G06F 16/248; G06F 16/2228; G06F 16/22; G06F 12/0292; G06F 16/221; G06F 16/2453; G06F 16/2455; G06F 16/245; G06F 16/24542; G06F 16/24544; G06F 16/316; G06F 16/26; G06F 16/287; G06F 16/2272; G06N 2/00
See application file for complete search history.

(56) References Cited

U.S. PATENT DOCUMENTS

| | | | |
|---|---|---|---|
| 5,918,225 A | 6/1999 | White et al. | |
| 6,223,171 B1 * | 4/2001 | Chaudhuri | .......... G06F 11/3447 |
| | | | 707/718 |
| 7,430,549 B2 | 9/2008 | Zane et al. | |
| 7,716,167 B2 | 5/2010 | Colossi et al. | |
| 7,805,388 B2 | 9/2010 | Weston et al. | |
| 8,885,928 B2 | 11/2014 | Forman | |
| 9,665,713 B2 | 5/2017 | Avasarala et al. | |
| 10,360,215 B1 | 7/2019 | Ciarlini et al. | |

(Continued)

FOREIGN PATENT DOCUMENTS

EP 2359265 A1 8/2011

OTHER PUBLICATIONS

"Provable Variable Selection for Streaming Features": Wang et al.: (9 Pages).

(Continued)

*Primary Examiner* — Yuk Ting Choi
(74) *Attorney, Agent, or Firm* — Griffiths & Seaton PLLC

(57) ABSTRACT

Embodiments for intelligent automated feature engineering for relational data in a computing environment by a processor. Indices may be automatically selected and built from one or more columns of one or more tables in a relational database using one or more automated feature engineering models that include a set of queries. One or more features may be determined using a set of queries of an automated feature engineering models to execute for a scoring operation.

20 Claims, 9 Drawing Sheets

(56) References Cited

U.S. PATENT DOCUMENTS

| | | |
|---|---|---|
| 10,366,346 B2 | 7/2019 | Achin et al. |
| 2005/0229158 A1 | 10/2005 | Thusoo et al. |
| 2010/0274785 A1* | 10/2010 | Procopiuc ............... G06F 16/22 707/E17.046 |
| 2016/0048758 A1 | 2/2016 | Campbell |
| 2016/0140355 A1 | 5/2016 | Jagota et al. |
| 2018/0150533 A1* | 5/2018 | Mathur ............... G06F 16/9535 707/718 |
| 2018/0203918 A1 | 7/2018 | Chen et al. |
| 2018/0357511 A1 | 12/2018 | Misra et al. |
| 2019/0050465 A1 | 2/2019 | Khalil et al. |
| 2019/0095515 A1 | 3/2019 | Buesser et al. |
| 2019/0197361 A1 | 6/2019 | Rajendran et al. |
| 2019/0220464 A1* | 7/2019 | Butani ............... G06F 16/24542 707/999.003 |
| 2019/0220472 A1 | 7/2019 | Chen et al. |
| 2019/0279102 A1 | 9/2019 | Cataltepe |
| 2020/0250163 A1* | 8/2020 | Kuimelis ............ G06F 16/2255 707/718 |

OTHER PUBLICATIONS

"Streaming feature selection algorithms for big data: A survey"; Alnuaimi et al.;(13 Pages).

"ExploreKit: Automatic Feature Generation And Selection";Katz et al.: (6 Pages).

"Proposing Enhanced Feature Engineering And A Selection Model For Machine Learning Processes";Uddin et al.; (32 Pages).

"Neural Feature Learning From Relational Database"; Lam et al.; arXiv:1801.05372v3; Jun. 17, 2018; (15 Pages).

"One button machine for automating feature engineering in relational databases";Lam et al.; arXiv:1706 . . . 327v1; Jun. 1, 2017; (9 Pages).

"Deep Feature Synthesis: Towards Automating Data Science Endeavors" authors: Kanter and Veeramachaneni 2015 IEEE (10 Pages).

\* cited by examiner

AUTOMATIC FEATURE ENGINEERING DURING ONLINE SCORING PHASE

BACKGROUND OF THE INVENTION

Field of the Invention

The present invention relates in general to computing systems, and more particularly to, various embodiments for providing efficient automated feature engineering during an online scoring phase in a computing environment using one or more computing processors.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, entertainment, travel and other devices. Accordingly, the use of computers, network appliances, and similar data processing devices continue to proliferate throughout society.

SUMMARY OF THE INVENTION

Various embodiments for providing efficient automated feature engineering during an online scoring phase in a computing environment by a processor, are provided. In one embodiment, by way of example only, a method for implementing intelligent automated feature engineering for relational data in a computing environment, again by a processor, is provided. Indices may be automatically selected and built from one or more columns of one or more tables in a relational database using one or more automated feature engineering models that include a set of queries. One or more features may be determined using a set of queries of an automated feature engineering models to execute for a scoring operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
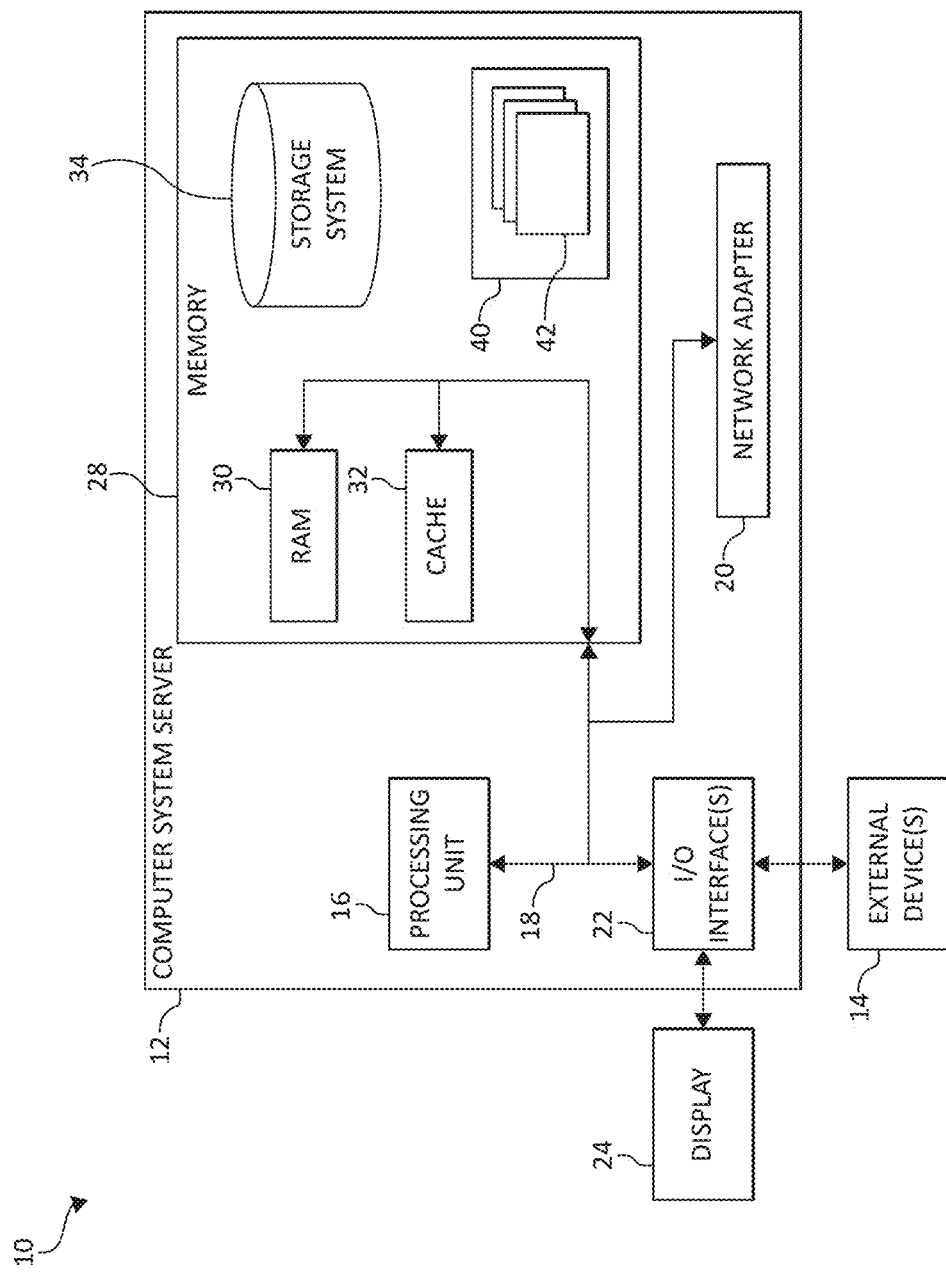
FIG. 1 is a block diagram depicting an exemplary cloud computing node according to an embodiment of the present invention.

Over the last decade, data analytics has become an important trend in many industries including e-commerce, healthcare, manufacture and more. The reasons behind the increasing interest are the availability of data, variety of open-source machine learning tools and powerful computing resources. Nevertheless, machine learning tools for analyzing data are still difficult to use and automate, since a typical data analytics project contains many tasks that have not been fully automated yet. For example, predictive data analytics project have attempted to provide automation tools yet there still remains a need to fully automate the various steps. Feature engineering, the cornerstone of successful predictive modeling, is one of the most important and time consuming tasks in predictive analytic operations because it prepares inputs to machine learning models, thus deciding how machine learning models will perform. That is, feature engineering is a critical step in data science, which impacts the final prediction results. Feature engineering involves understanding domain knowledge and data exploration to discover relevant hand-crafted features from raw data.

"Features," for example, are the observations or characteristics on which a model is built. The process of deriving a new abstract feature based on the given data is broadly referred to as feature engineering. It is typically done using one of the many mathematical or statistical functions called "transformations." A key step in data science projects is the transformation of raw data into "features" that can be used as inputs for machine learning models. Often, the raw data is stored across various tables in a relational database and need to be combined in various ways. That is, "feature engineering" builds "features" out of existing data, which is often times spread out across multiple related tables. The relevant information needs to be extracted from the data and placed into a single table, which can then be used to train a machine learning model. What makes the task of effective feature engineering hard is that there are literally a countless number of options of transformations a data scientist could perform. Moreover, working through those options with the trial and error of applying transformations and assessing their impact is very time consuming, often infeasible to perform thoroughly. On the other hand, feature engineering is central to producing accurate models, which presents a dilemma to a data scientist on how much time to devote to it.

Automated feature engineering attempts to automatically created candidate features from a dataset that may be selected and used for training. Automated feature engineering attempts to assists the data scientists by reducing manual efforts in a data science project from relational data helps data scientists saving a significant amount of time in data science project. However, a need exists for efficient automated feature engineering during the online scoring phase after the automated feature engineering model has been trained and deployed for online scoring.

Online scoring a feature engineering model for relational data happens after the training phase has been done. Users provide at input new data for scoring, the system loads the saved model during training and runs the scoring for the provided data. New data includes additional rows in contextual tables and new row in the main table. In each request for online scoring, the number of rows in the main table is small but the number of requests can arrive at high speed to serve online applications.

Accordingly, various embodiments are provided herein for providing efficient automated feature engineering during an online scoring phase in a computing environment. Indices may be automatically selected and built from one or more columns of one or more tables in a relational database using one or more automated feature engineering models that include a set of queries. One or more features may be determined using a set of queries of an automated feature engineering models to execute for a scoring operation.

In one aspect, the present invention provides for, given an automated feature engineering model (e.g., output of the training phase) which includes a set of queries (e.g., structured query language "SQL") that needs to execute to compute features for scoring, indices for columns in the database tables may be automatically built to efficiently serve the queries. The number of columns and which columns selected for indexing may be determined automatically based on the queries provided in the automated feature engineering model after the training phase.

Also, given one or more constraints (e.g., an input automated feature engineering model such as, for example, a budget constraint) on the indexing size (e.g., memory limit), a set of columns that needs to index may be selected subject to maximizing a scoring query throughput under the one or more constraints. For example, users have memory constraint on the index size, e.g. maximum 10 GB. Assume that it is required to index 10 columns to serve the scoring queries. Because the memory limit is restricted, only the indices of up to 8 columns may be accommodated. Thus, it must be decided which columns will be selected for indexing. Thus, the present invention will automatically and dynamically select these columns to index such that the query throughput is maximized (e.g., the number online scoring request per second) subject to the memory constraint. When the indices exceed/grow beyond the indexing size limit, the present invention re-indexes the data automatically to change the set of indexed columns dynamically based on the constraints on the indexing size (e.g., by using the budget constraints input that are input into the automated feature engineering model and using the current database size). One or more queries (e.g., SQL queries) may be automatically created that perform a look-up operation to identified joined key values in the indices and then filters the contextual data using the look-up key values prior to executing a scoring operation on the filtered, contextual data for joining with a main table (e.g., prior to sending filtered data to the scoring server for joining with the main table.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
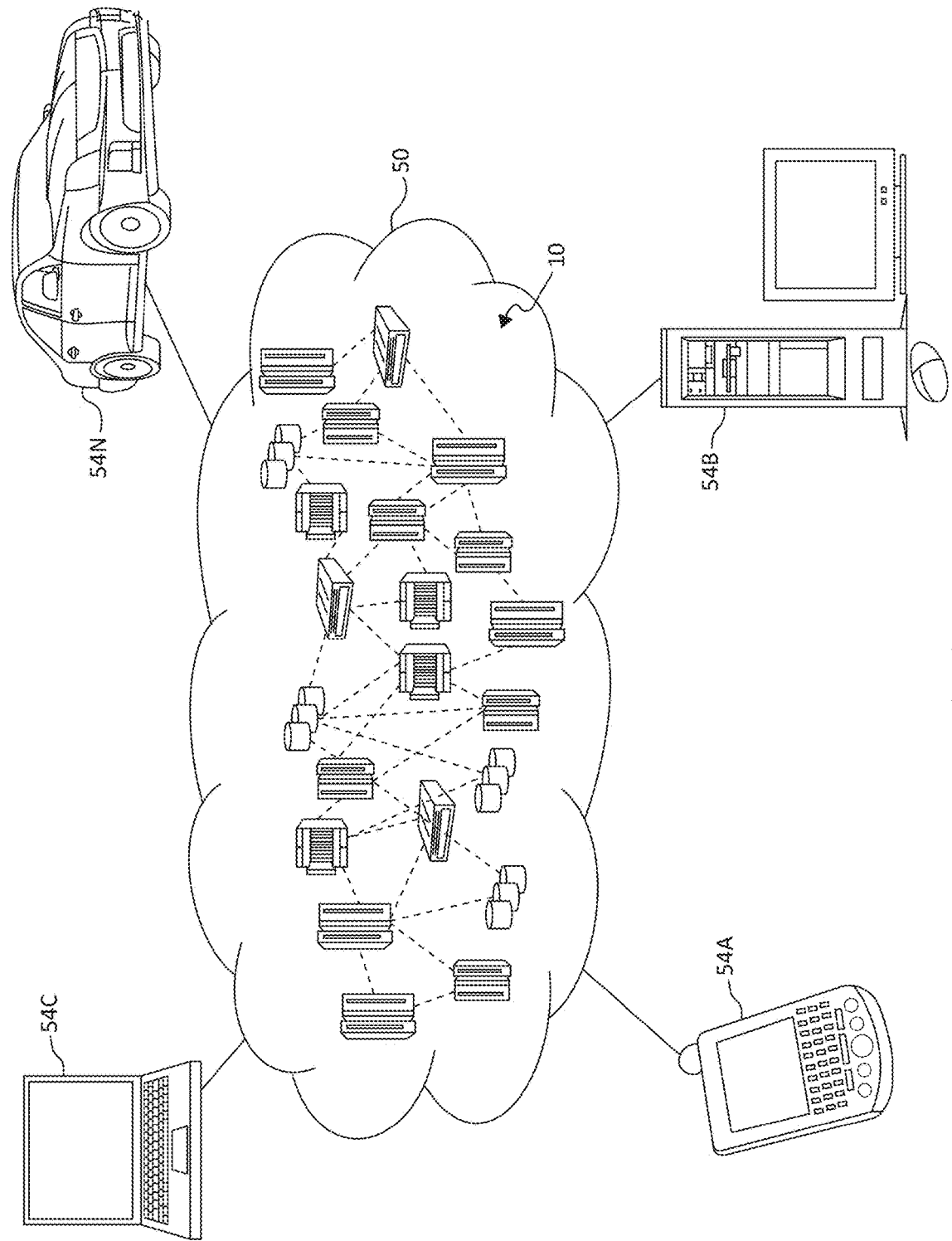
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
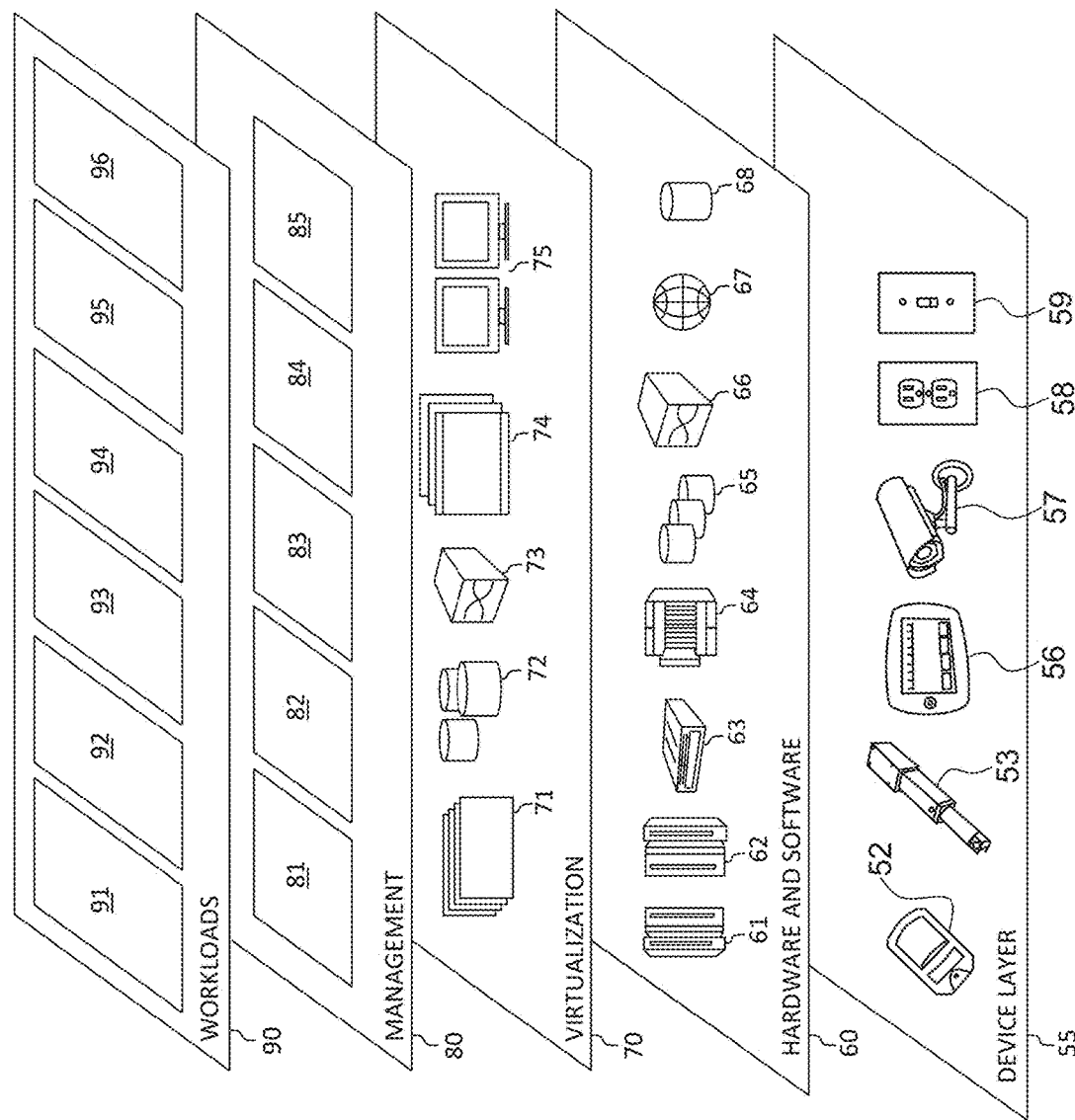
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing efficient automated feature engineering during an online scoring phase. In addition, workloads and functions 96 for providing efficient automated feature engineering during an online scoring phase may include such operations as data analytics, data analysis, and as will be further described, notification functionality. One of ordinary skill in the art will appreciate that the workloads and functions 96 for providing efficient automated feature engineering during an online scoring phase may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
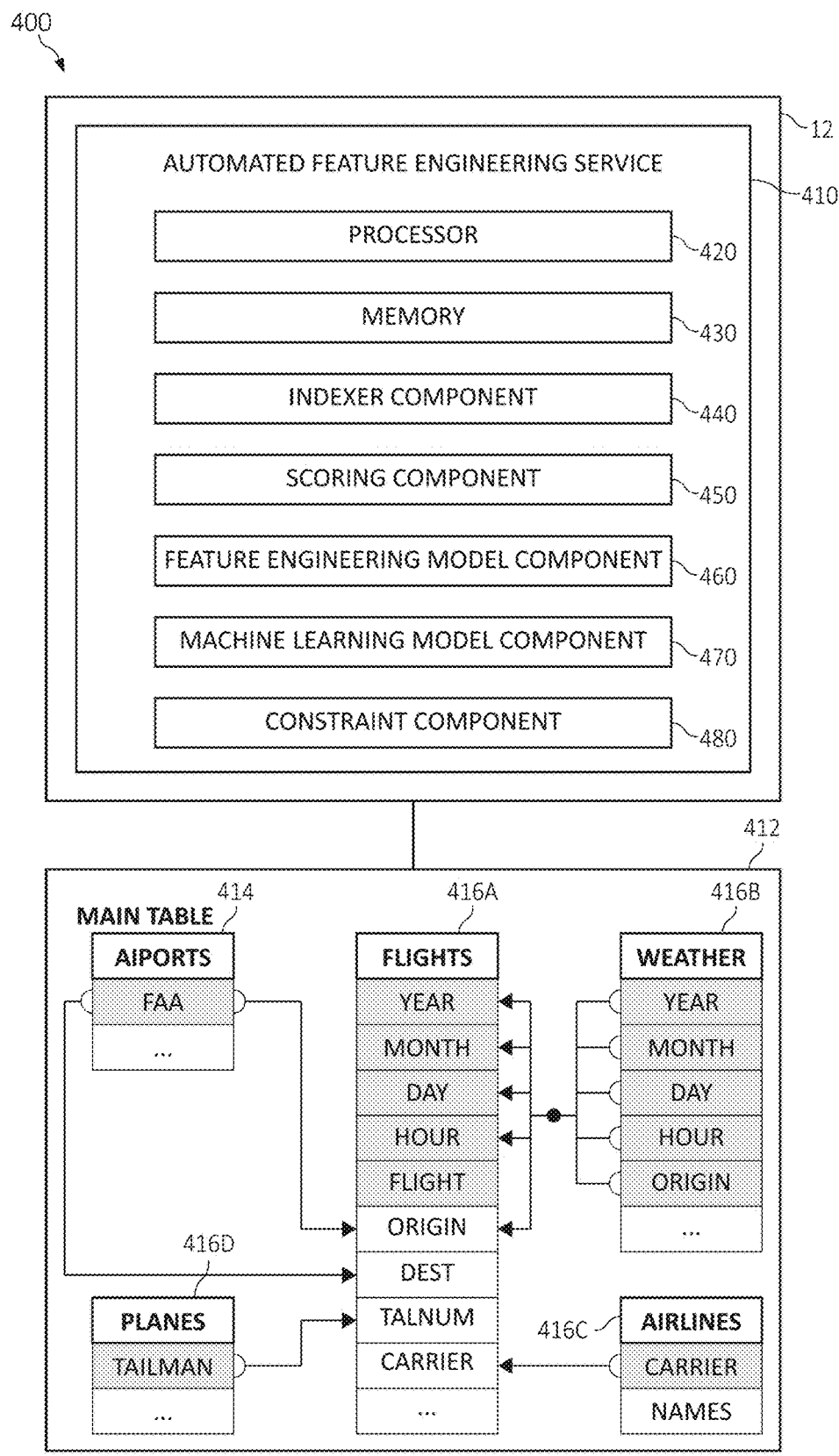
FIG. 4 is an additional block diagram depicting efficient automated feature engineering during an online scoring phase according to an embodiment of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. Repetitive description of like elements employed in other embodiments described herein is omitted for sake of brevity.

An automated feature engineering service 410 is shown, incorporating processing unit ("processor") 420 to perform various computational, data processing and other functionality in accordance with various aspects of the present invention. The automated feature engineering service 410 may be provided by the computer system/server 12 of FIG. 1. The processing unit 420 may be in communication with memory 430. The automated feature engineering service 410 may include an indexer component 440, a scoring component 450, a feature engineering model component 460, a machine learning model component 470, and a constraint component 480.

As one of ordinary skill in the art will appreciate, the depiction of the various functional units in automated feature engineering service 410 is for purposes of illustration, as the functional units may be located within the automated feature engineering service 410 or elsewhere within and/or between distributed computing components.

In general, by way of example only, the automated feature engineering service 410, using the indexer component 440 (in association with the machine learning model component 470) may automatically select and build indices from one or more columns of one or more tables in a relational database such as, for example, database 412, using one or more automated feature engineering models that include a set of queries. The feature engineering model component 460 may determine one or more features using a set of queries of an automated feature engineering models to execute for a scoring operation.

Additionally, the indexer component 440 (in association with the machine learning model component 470) may select the one or more columns (from the database 412) for selecting and building the indices according to the set of queries in the one or more automated feature engineering models. In an additional aspect, the indexer component 440 (in association with the machine learning model component 470) may select the one or more columns for selecting and building the indices according one or more constraints of a size of an index in the relational database 412.

The scoring component 450 may maximize a scoring query throughput based on one or more constraints in the relational database 412 for selecting the one or more columns for selecting and building the indices by the indexer component 440. The indexer component 440, in association with the constraint component 480, may also automatically re-index data in the relational database to adjust a size of one or more sets of column indices according to one or more constraints.

The feature engineering model component 460 may automatically create one or more queries to identify one or more key values matching records in the one or more tables (e.g., a main table 414 and contextual tables 416A-D). In an additional aspect, the feature engineering model component 460 may automatically create one or more queries that performs a look-up for joined keys in the indices and filter contextual data using the joined keys for performing the scoring operation for joining with the main table 414 of the database 412. It should be noted that the tables of the database 412, by way of example only, may include the main table 414 and one or more contextual tables such as, for example, contextual tables 416A-D.

It should be noted that automated feature engineering provided by the automated feature engineering service 410 (which may use one or more components described herein) may include joining a main table of the relational database 412 with one or more contextual tables following different join paths up to a predefined maximum depth and applying one or more predefined sets of extractors to generate one or more features for each entry in the main table 414. In one embodiment, by way of example only, automatic feature engineering from a relational data may be performed by searching for relevant joining paths ("join paths") to join the tables (e.g., a main table 414 and contextual tables 416A-D) in the database 412 and proper transformations of the joined tables into features. In one aspect, a "join path" may be one of many combinations/sequences of joins among all the tables (e.g., a main table 414 and contextual tables 416A-D) of the relational database 412. Moreover, a join path may contain one or more frequently accessed columns from one or more tables (e.g., a main table 414 and contextual tables 416A-D). A "Join table" describes a table participating in one or more of these joins. One or more features may be extracted from the relational database with one or multiple tables based on the join paths of the relational database 412.

It should be noted that after the training phase of an automated feature engineering model, the automated feature engineering service 410 (which may use one or more components described herein such as, for example, the machine learning model component 470) may save the trained automated feature engineering model with necessary information such that the feature engineering processes may be repeated for new data during the scoring phase.

The machine learning model component 470 may train an automated feature engineering model to use original features of the database 412 and newly extracted features. In one aspect, the "features" may be the values stored in columns of each table (e.g., a main table 414 and contextual tables 416A-D) in the database 412. "Original" may refer to the features/columns that exist in the database before applying any feature engineering to the database. In one aspect, the automated feature engineering service 410 may, for example, add labels to column names that represent how a feature has been engineered. Thus, the automated feature engineering service 410 may, for example, refer to a state of the database before feature engineering is applied and use the original column names to filter the "original features". Distinguishing between "original" and "new" features is important, for example, to demonstrate the performance/ usefulness of the feature engineering such as, for example, when a machine learning model achieves better performance by using the original and new features instead of just using the original features. It is also important for explaining how the features have been created, e.g., are they original or engineered by a certain join path and transformation combination.

The machine learning model component 470 may be used to determine a degree of importance score (e.g., a scoring phase).

Figure 5:
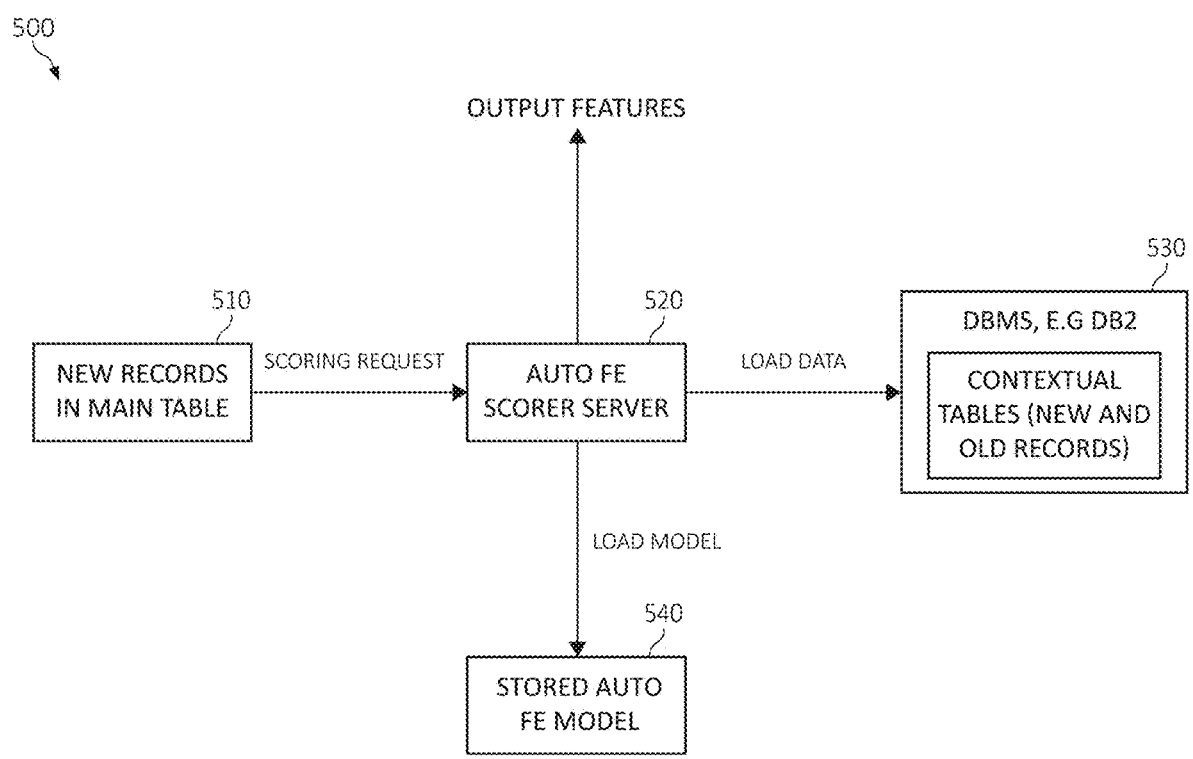
FIG. 5 is a block flow diagram depicting operations for providing efficient automated feature engineering according to an embodiment of the present invention.

Turning now to FIG. 5, a block diagram 500 depicts exemplary operations for providing efficient automated feature engineering during the scoring phase. In one aspect, one or more of the components, modules, services, applications, and/or functions described in FIGS. 1-4 may be used in FIG. 5. Repetitive description of like elements employed in other embodiments described herein is omitted for sake of brevity.

In operations, during a scoring phase, one or more contextual tables may be stored and/or maintained in a database such as, for example, a database management system ("DBMS" server). These one or more contextual tables may contain historical data with both old and new records and may be continuously updated. These one or more contextual tables may contain a significant amount of data (e.g., large transactional tables in a bank with ten thousands new records per day). When a new records 510 in a main table (such as, for example, a main table 414 in FIG. 4) arrives, a scoring request is sent to a scoring component 520 such as, for example, an automated ("auto") feature engineering ("FE") scorer server (see also the scoring component 450 of FIG. 4), which loads the contextual tables of the database 530 (e.g., DBMS or "DB2") to the scoring component 520 to generate one or more features for the new main table records 510 using a trained an automated feature engineering model 540 (e.g., stored auto FE model that has been trained), which may be stored and maintained following a training operation.

Figure 6A:
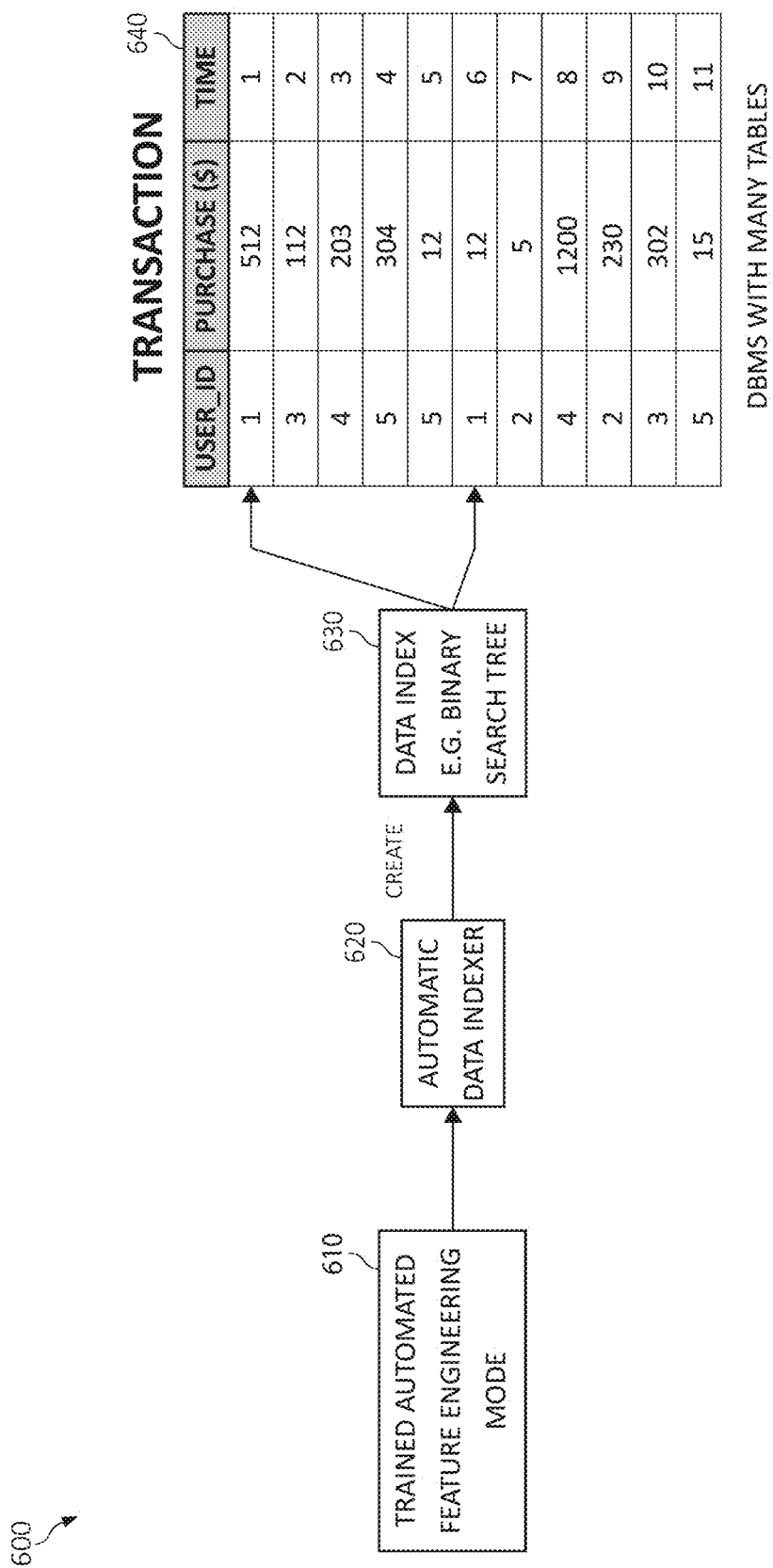
FIG. 6A-6C are additional block diagrams depicting operations for providing efficient automated feature engineering according to an embodiment of the present invention.
Figure 6B:
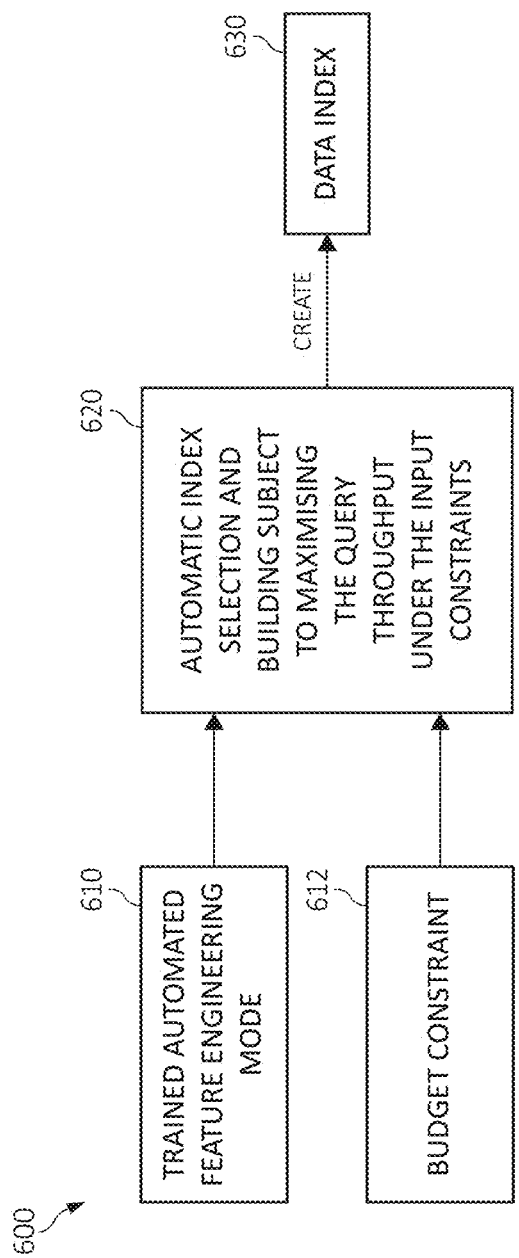
Figure 6C:
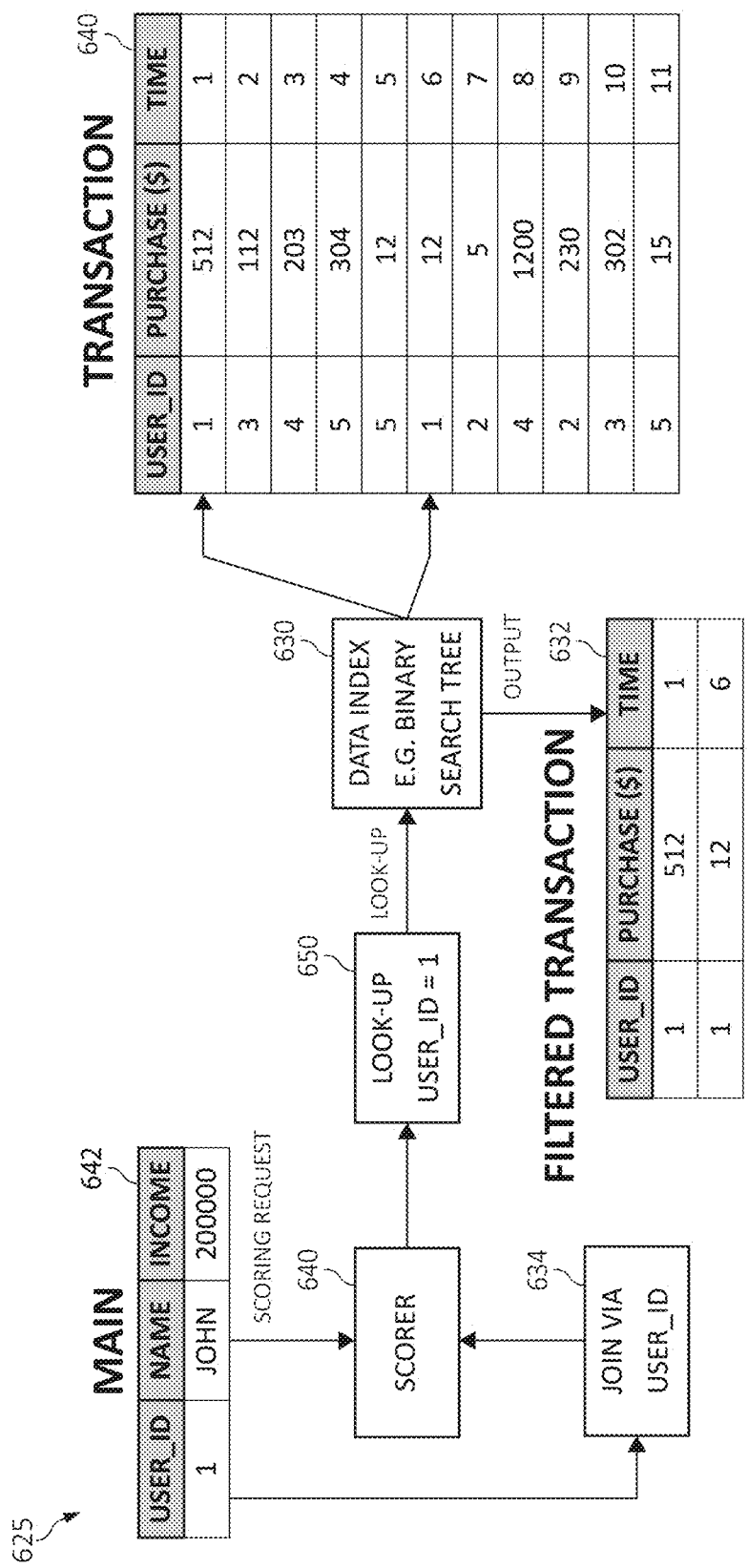

Turning now to FIGS. 6A-6C, a diagrams 600, 615, and 625 depicts exemplary operations for providing efficient automated feature engineering. For example, diagram 600 of FIG. 6A depicts operations for automatic index building, diagram 615 of FIG. 6B depicts operations for automatic index building under various constraints (e.g., budget constraints), and diagram 625 of FIG. 6C depicts operations for automatic query generation for online scoring. In one aspect, one or more of the components, modules, services, applications, and/or functions described in FIGS. 1-5 may be used in FIGS. 6A-6C. Repetitive description of like elements employed in other embodiments described herein is omitted for sake of brevity.

Turning now to FIG. 6A, depicts a trained automated feature engineering model 610 trained with an input relational data that is sent to an indexer 620 (e.g., an automatic data indexer). The indexer 620 may automatically select and build (e.g., create) one or more indices 630 (e.g., a data index such as, for example, a binary search tree) for necessary or required columns (e.g., a user identifier "ID" (user_id"), purchase, and/or time) for each table 640 in the database using information from the trained automated feature engineering models.

It should be noted that table 640 (e.g., a database table) may be a table of a relational database, as described in FIG. 4. A column of the database table 640 in a relational database (e.g., relational database 412 of FIG. 4) may represent a feature (e.g., a user identifier "user_id), a joining key (e.g., purchase or time), etc. A row of the table 640 in a relational database (e.g., relational database 412 of FIG. 4) may represent an observation or sample of the data. It should be noted that "joining keys" may refers to either primary or foreign keys. It should be noted that the present invention may, for example, when referring to the term "features" means the columns of the joined table resulting from each joining path.

As depicted in FIG. 6B, the trained automated feature engineering model 610 with the input relational data may also include one or more constraints (e.g., budget constraints 612) on the index size, the indexer 620 automatically select and build (e.g., create) one or more indices 630 (e.g., a data index such as, for example, a binary search tree) for necessary or required columns (e.g., a user ID, purchase, and/or time) for each table 640 in the database to maximize the scoring query throughput while keeping (e.g., adhering) the constraints. When an index size of the data index 630 increases/grows beyond a defined index limit, the indexer 620 may be triggered to reselect and rebuild the indices to update the one or more indices 630 of the database.

Turning now to FIG. 6C, for each scoring request (e.g., creating query to identify one or more key values from the main table 642), the scorer 640 automatically identifies one or more key values 650 (e.g., "user_id=1") needs to look-up via a look up operation. These key values 650 may be sent to the indices 630 to look-up for table records 640 that match the key values in the database. The table 640 with only matching records (e.g., the user_id is "1") are filtered (e.g., filtered record 632) and loaded to serve the join queries 634 (e.g., join via user_id), for automated feature engineering scoring, instead of sending the entire table 640 over the network. The filtered record 632 (e.g., filtered table) is sent to join with the main table, which saves time and computing efficiency because of the larger, increased computer overhead required for sending the larger, unfiltered table 640 over the network. For example, the filtered transaction depicts the filtered record 632 and then loaded for the join queries 634.

Figure 7:
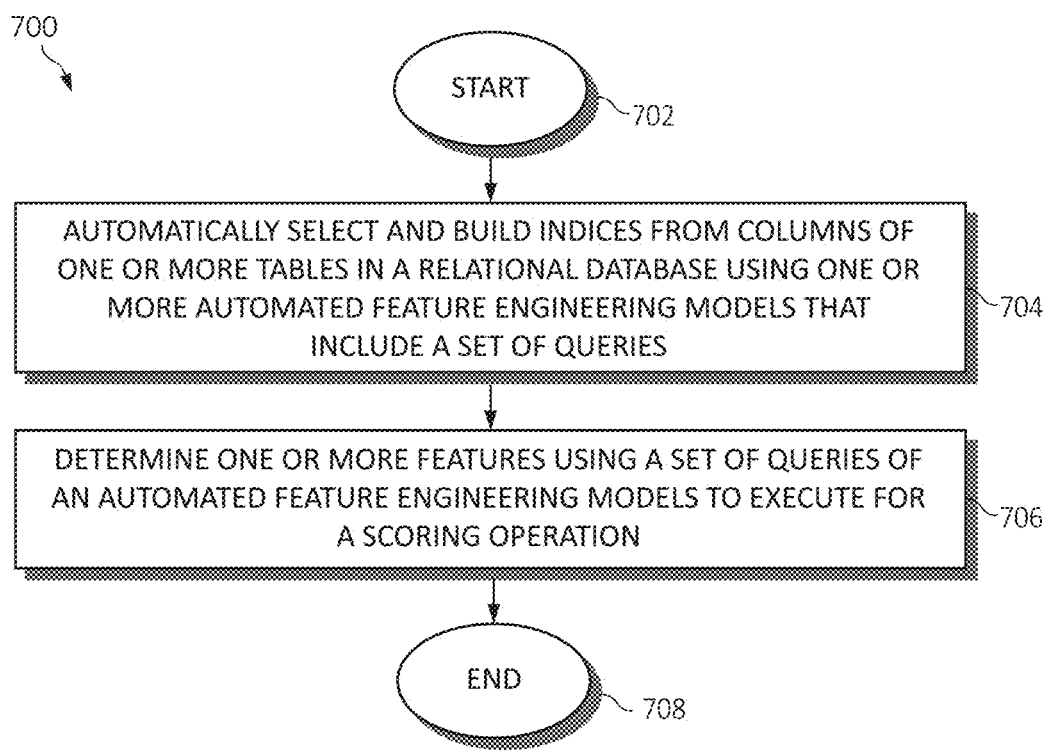
FIG. 7 is a flowchart diagram depicting an exemplary method for implementing efficient automated feature engineering in a computing environment by a processor, again in which aspects of the present invention may be realized.

FIG. 7 is a flowchart diagram depicting an exemplary method providing efficient automated feature engineering during an online scoring phase in a computing environment. In one aspect, each of the devices, components, modules, operations, and/or functions described in FIGS. 1-6A-6C also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

One or more Indices may be automatically selected and built from one or more columns of one or more tables in a relational database using one or more automated feature engineering models that include a set of queries, as in block 704. One or more features may be determined using a set of queries of an automated feature engineering models to execute for a scoring operation, as in block 706. In one aspect, the functionality 700 may end, as in block 708.

In one aspect, in conjunction with and/or as part of at least one block of FIG. 7, the operations of method 700 may include each of the following. The operations of method 700 may train the machine learning model using the one or more features of the relational database. The operations of method 900 may extract the one or more features from the relational database having one or more tables based on the one or more join paths. The operations of method 900 may aggregate each of the one or more features for the one or more join paths according to the degree of importance score.

The operations of method 700 may select the one or more columns for selecting and building the indices according to the set of queries in the one or more automated feature engineering models, and/or select the one or more columns for selecting and building the indices according one or more constraints of a size of an index in the relational database.

The operations of method 700 may maximize a scoring query throughput based on one or more constraints in the relational database for selecting the one or more columns for selecting and building the indices, and/or automatically re-index data in the relational database to adjust a size of one or more sets of column indices according to one or more constraints.

The operations of method 700 may automatically create one or more queries to identify one or more key values matching records in the one or more tables.

The operations of method 700 may automatically create one or more queries that performs a look-up for joined keys in the indices, and/or filter contextual data using the joined keys for performing the scoring operation for joining with a main table, wherein the one or more tables include the main table and one or more contextual tables.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent automated feature engineering for relational data in a computing environment, comprising:

executing machine learning logic to generate one or more automated feature engineering models, wherein the one or more automated feature engineering models are trained to join a main table of a plurality of tables of a relational database with one or more contextual tables of the plurality of tables following differing join paths up to a predefined maximum depth, and apply one or more predefined sets of extractors to identify one or more features for the plurality of tables based on the join paths;

labeling each of one or more columns of the plurality of tables in the relational database by the machine learning logic to indicate how the one or more features contained within the one or more columns was engineered, wherein the one or more automated feature engineering models use the labels determine a performance of a feature engineering operation by filtering between labeled original features and labeled new features engineered subsequent to the one or more automated feature engineering models applying the feature engineering operation;

automatically selecting and building indices from the one or more columns of the plurality of tables in the relational database using the one or more automated feature engineering models that include a set of queries; and determining the one or more features using the set of queries of the one or more automated feature engineering models to execute for a scoring operation.

2. The method of claim 1, further including selecting the one or more columns for selecting and building the indices according to the set of queries in the one or automated feature engineering models.

3. The method of claim 1, further including selecting the one or more columns for selecting and building the indices according one or more constraints of a size of an index in the relational database.

4. The method of claim 1, further including maximizing a scoring query throughput based on one or more constraints in the relational database for selecting the one or more columns for selecting and building the indices.

5. The method of claim 1, further including automatically re-indexing data in the relational database to adjust a size of one or more sets of column indices according to one or more constraints.

6. The method of claim 1, further including automatically creating one or more queries to identify one or more key values matching records in the plurality of tables.

7. The method of claim 1, further including:
   automatically creating one or more queries that performs a look-up for joined keys in the indices; and
   filtering contextual data using the joined keys for performing the scoring operation for joining with the main table.

8. A system for implementing intelligent automated feature engineering for relational data in a computing environment, comprising:
   one or more computers with executable instructions that when executed cause the system to:
      execute machine learning logic to generate one or more automated feature engineering models, wherein the one or more automated feature engineering models are trained to join a main table of a plurality of tables of a relational database with one or more contextual tables of the plurality of tables following differing join paths up to a predefined maximum depth, and apply one or more predefined sets of extractors to identify one or more features for the plurality of tables based on the join paths;
      label each of one or more columns of the plurality of tables in the relational database by the machine learning logic to indicate how the one or more features contained within the one or more columns was engineered, wherein the one or more automated feature engineering models use the labels determine a performance of a feature engineering operation by filtering between labeled original features and labeled new features engineered subsequent to the one or more automated feature engineering models applying the feature engineering operation;
      automatically select and build indices from the one or more columns of the plurality of tables in the relational database using the one or more automated feature engineering models that include a set of queries; and
      determine the one or more features using the set of queries of the one or more automated feature engineering models to execute for a scoring operation.

9. The system of claim 8, wherein the executable instructions that when executed cause the system to select the one or more columns for selecting and building the indices according to the set of queries in the one or more automated feature engineering models.

10. The system of claim 8, wherein the executable instructions that when executed cause the system to select the one or more columns for selecting and building the indices according one or more constraints of a size of an index in the relational database.

11. The system of claim 8, wherein the executable instructions that when executed cause the system to maximize a scoring query throughput based on one or more constraints in the relational database for selecting the one or more columns for selecting and building the indices.

12. The system of claim 8, wherein the executable instructions that when executed cause the system to automatically re-index data in the relational database to adjust a size of one or more sets of column indices according to one or more constraints.

13. The system of claim 8, wherein the executable instructions that when executed cause the system to automatically create one or more queries to identify one or more key values matching records in the plurality of tables.

14. The system of claim 8, wherein the executable instructions that when executed cause the system to:
   automatically create one or more queries that performs a look-up for joined keys in the indices; and
   filter contextual data using the joined keys for performing the scoring operation for joining with the main table.

15. A computer program product for, by a processor, implementing intelligent automated feature engineering for relational data in a computing environment, the computer program product comprising a non-transitory computer-readable storage medium having computer-readable program code portions stored therein, the computer-readable program code portions comprising:
   an executable portion that executes machine learning logic to generate one or more automated feature engineering models, wherein the one or more automated feature engineering models are trained to join a main table of a plurality of tables of a relational database with one or more contextual tables of the plurality of tables following differing join paths up to a predefined maximum depth, and apply one or more predefined sets of extractors to identify one or more features for the plurality of tables based on the join paths;
   an executable portion that labels each of one or more columns of the plurality of tables in the relational database by the machine learning logic to indicate how the one or more features contained within the one or more columns was engineered, wherein the one or more automated feature engineering models use the labels determine a performance of a feature engineering operation by filtering between labeled original features and labeled new features engineered subsequent to the one or more automated feature engineering models applying the feature engineering operation;
   an executable portion that automatically selects and builds indices from the one or more columns of the plurality of tables in the relational database using the one or more automated feature engineering models that include a set of queries; and
   an executable portion that determines the one or more features using the set of queries of the one or more automated feature engineering models to execute for a scoring operation.

16. The computer program product of claim 15, further including an executable portion that selects the one or more columns for selecting and building the indices according to the set of queries in the one or more automated feature engineering models.

17. The computer program product of claim 15, further including an executable portion that selects the one or more columns for selecting and building the indices according one or more constraints of a size of an index in the relational database.

18. The computer program product of claim 15, further including an executable portion that maximizes a scoring query throughput based on one or more constraints in the relational database for selecting the one or more columns for selecting and building the indices.

19. The computer program product of claim 15, further including an executable portion that:
   automatically re-indexes data in the relational database to adjust a size of one or more sets of column indices according to one or more constraints; or
   automatically creates one or more queries to identify one or more key values matching records in the plurality of tables.

20. The computer program product of claim 15, further including an executable portion that:
   automatically creates one or more queries that performs a look-up for joined keys in the indices; and
   filters contextual data using the joined keys for performing the scoring operation for joining with the main table.

* * * * *